United States Patent [19]

Hauk et al.

[11] 4,185,492
[45] Jan. 29, 1980

[54] LEAK TESTING APPARATUS AND IMPROVED SEALS THEREFOR

[76] Inventors: Thomas D. Hauk, 5313 Mezzanine Way, Long Beach, Calif. 90808; Ernest D. Hauk, 57430 Aviation Dr., Yucca Valley, Calif. 92284

[21] Appl. No.: 950,026

[22] Filed: Oct. 10, 1978

[51] Int. Cl.$^2$ .................. G01M 3/28; F17D 5/02
[52] U.S. Cl. ........................ 73/46; 73/49.1; 277/2
[58] Field of Search ............ 73/49.8, 46, 49.1, 49.5; 277/2, 9.5, 34.6; 285/18; 138/99

[56] References Cited

U.S. PATENT DOCUMENTS

| | | | |
|---|---|---|---|
| 316,506 | 4/1885 | Upperman . | |
| 316,967 | 5/1885 | Heber | 48/193 |
| 317,283 | 5/1885 | Bartley | 48/193 |
| 793,589 | 6/1905 | Kellogg | 138/97 |
| 1,004,348 | 9/1911 | Benedetti et al. . | |
| 1,221,733 | 4/1917 | Henderson . | |
| 1,867,321 | 7/1932 | McEvoy . | |
| 1,914,472 | 6/1933 | Wickersham . | |
| 2,054,336 | 9/1936 | Penick et al. . | |
| 2,079,646 | 5/1937 | Abegg . | |
| 2,255,921 | 9/1941 | Fear | 73/46 |
| 2,258,176 | 10/1941 | Denning . | |
| 2,481,013 | 9/1949 | Henderson | 138/90 |
| 2,571,236 | 10/1951 | Hamilton, Jr. | 73/46 |
| 2,587,192 | 2/1952 | Meyer | 73/46 |
| 2,761,311 | 9/1956 | Baker | 73/46 |
| 2,817,230 | 12/1957 | McCully | 73/46 |
| 2,981,331 | 4/1961 | Arterbury | 166/4 |
| 3,034,339 | 5/1962 | Gawlik | 73/46 |
| 3,151,631 | 10/1964 | Yano | 138/97 |
| 3,358,766 | 12/1967 | Current | 166/134 |
| 3,371,521 | 3/1968 | Hauk | 73/46 |
| 3,490,525 | 1/1970 | Nettles | 166/97 |
| 3,744,822 | 7/1973 | Arnold | 285/18 |
| 3,842,659 | 10/1974 | Bacroix | 73/40.7 |
| 3,921,437 | 11/1975 | Hauk | 73/40.5 R |
| 3,975,945 | 8/1976 | Hauk et al. | 73/46 |
| 4,099,405 | 7/1978 | Hauk et al. | 73/46 |

FOREIGN PATENT DOCUMENTS

| | | |
|---|---|---|
| 812848 | 9/1951 | Fed. Rep. of Germany . |
| 542164 | 12/1941 | United Kingdom . |
| 1410584 | 10/1975 | United Kingdom | 73/49.1 |

*Primary Examiner*—Gerald Goldberg
*Assistant Examiner*—Joseph W. Roskos
*Attorney, Agent, or Firm*—Gausewitz, Carr & Rothenberg

[57] ABSTRACT

An external tester defines a sealed chamber around a pipe joint, such chamber then being filled with fluid under very high pressure. After introduction of fluid into the test chamber is terminated, a determination is made as to whether or not the pressure is reducing, any such reduction indicating that a leak is present in the pipe joint. To define a test chamber which is perfectly sealed so that fluid will not escape otherwise than through a leak in the pipe joint there are provided longitudinal sealing elements and arcuate sealing elements interrelated with each other and with an insert of the longitudinal elements. The inserts stiffen and mount the longitudinal elements, provide indexing of the casing sections, and prevent extrusion of the seal rubber, all in such a manner that no cracks remain through which the fluid may escape.

28 Claims, 10 Drawing Figures

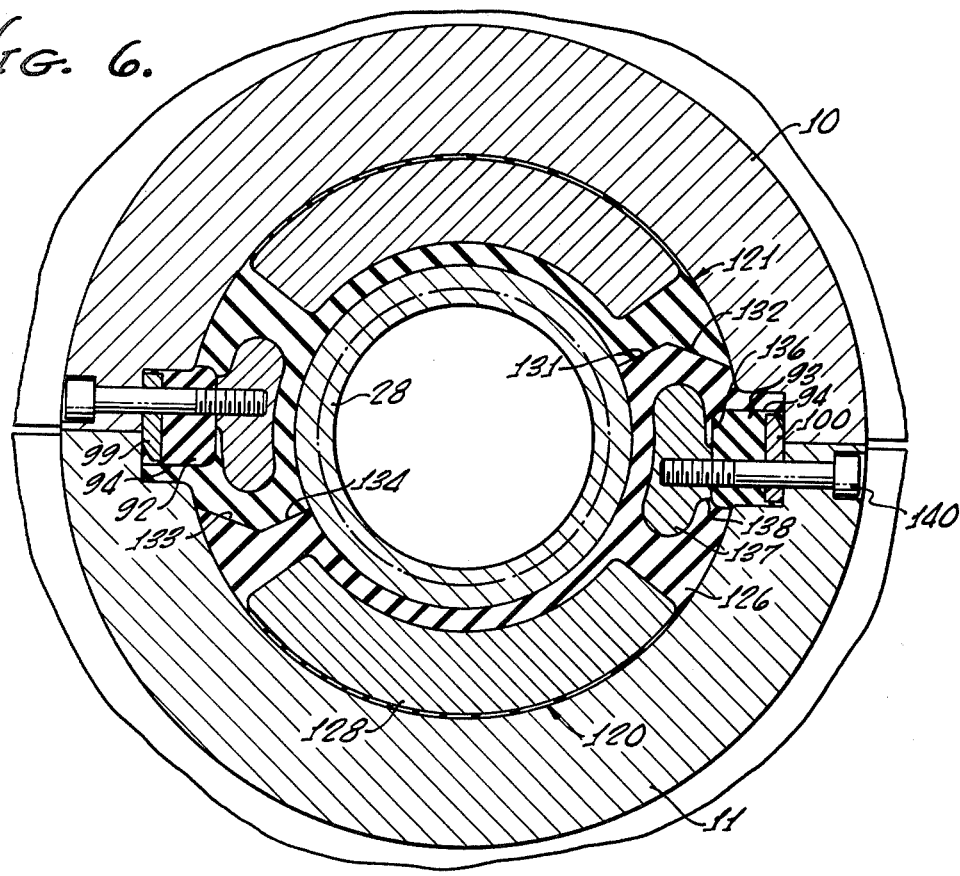

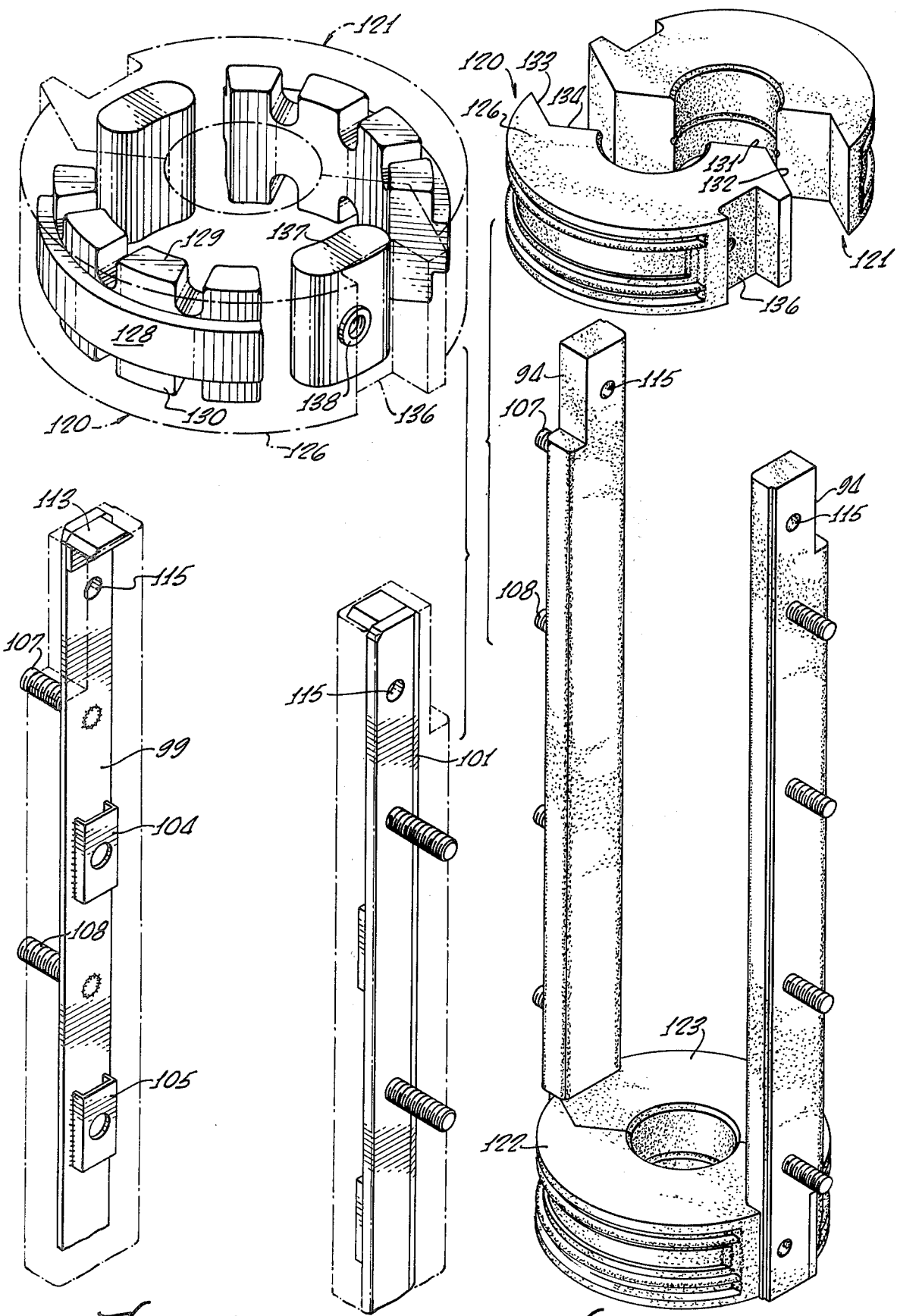

LEAK TESTING APPARATUS AND IMPROVED SEALS THEREFOR

BACKGROUND OF THE INVENTION

1. Field of the Invention

This invention relates to the field of apparatus for creating sealed test chambers externally around pipe sections and similar devices, the seals being such that many thousands of pounds of pressure per square inch may be contained in the chambers.

2. Description of the Prior Art

There exist substantial numbers of prior art patents for apparatus wherein longitudinal and circumferential seals are provided in order to permit a sealed chamber to be defined around a section of pipe. Patents of this type include, for example, U.S. Pat. Nos. 2,255,921 and 3,744,822. However, the constructions set forth in these and other patents are believed to be incapable of containing and sealing fluid pressures anywhere as near as high as those which may be contained and sealed with the present apparatus and seals. It is to be understood that the higher the test pressure the more rapidly and readily a leak may be detected.

It is extremely important that the apparatus be adapted to open and close rapidly to laterally receive a pipe section when the apparatus is in open condition and to seal pressure of such extreme magnitude that even minute leaks will be readily apparent in a short test period.

Insofar as applicants are aware, the only prior art external tester apparatus which has achieved major commercial success in the oil well industry is that described in U.S. Pat. No. 3,371,521 and improvements thereon which are specified in a Notice of Prior Art found in the present application file. Such apparatus, however, is deficient in important respects, one of which is that it requires a unitarily molded complex packer. The packer is such that the fluid in the test chamber only contacts rubber. Such packers are not only complex and expensive to mold but also bulky to ship and store. Furthermore, when one portion of the packer wears out the entire packer must be discarded, it being impracticable or impossible to replace any one portion of the packer. A further disadvantage relative to such packers is that they are sometimes difficult to load into the casings in the field, this being because the as molded packer circumference at its exterior is larger than the circumference of the closed casing at its interior.

In a U.S. Pat. No. 3,975,945 to Hauk and Carstenson, and in our earlier U.S. Pat. No. 4,099,405 there are disclosed leak testers involving seals made of several elements, including pairs of arcuate segments at either end and a pair of strip seals. Such sealing arrangements have a number of advantages, including ready mass production, shipping and storage, ease of mounting in the casing in the field, separate replaceability when worn, and manufacture in small, common molds. It has been found, however, that strip seals of the above-mentioned U.S. Pat. Nos. 3,975,945 and 4,099,405 are not satisfactory for leak testing under certain very high pressures. In particular the use of an indexing bar such as the bar 88 of FIG. 20 of U.S. Pat. No. 3,975,945, which must fit into an indexing slot in the other casing section, inherently requires a certain amount of tolerance in the sliding fit of the bar into the slot. Without some amount of tolerance the bar cannot enter and be removed from the slot as the casing sections close and open. These tolerances provide a space sufficient to permit extrusion of seal strip rubber from the interior of the pressurized chamber under certain very high testing pressures. Further, it is found that the mounting of the strip seals to the casing is difficult since problems are encountered in the field in aligning apertures of strip seal sections and casing for insertion of securing bolts. Problems also have been encountered in sealing of the interconnection between the strip seals and the arcuate seal segments in the arrangements of these patents.

Accordingly, it is an object of the present invention to provide a leak tester having a number of individual and separately replaceable sealing elements and which avoids or eliminates problems referred to above.

SUMMARY OF THE INVENTON

The present apparatus and method comprise at least two end seals at each end of the test chamber and at least two strip seals extending between the sets of end seals. In accordance with one aspect of the invention, each strip seal extends along and into an outwardly facing recess of the end seals and the end and strip seals are bolted to each other and to the casing by a single bolt extending therethrough. At this point of attachment on the end seal there is provided a relatively thick insert to decrease the amount of rubber and, therefore, to decrease compressibility at this area.

Another significant aspect of the invention comprises the use of an insert bar that provides a multiplicity of functions, which functions are provided by several different elements in prior devices. Such functions include (a) reinforcement of the strip seal rubber body, (b) attachment of the strip seal to the casing, (c) indexing of the casing sections during closing, and (d) prevention of extrusion of the rubber body through the longitudinal joint between closed casing sections. This multiplicity of functions is provided by positioning a non-deformable bar insert so as to have an outer surface planar with the outer surface of the rubber body and fixing outwardly projecting connecting elements to the insert for projection into and securement to the casing. The positioning is such that the insert is held against one casing section on one side of the longitudinal casing joint and bridges such joint in close, tight contact with the side of the other casing section when the sections are closed. The rubber body is received within a longitudinal recess formed in the casing sections at the longitudinal joint. Thus the insert enhances the compression ratio (that is, the percentage of compression) of the rubber body which occurs when the casing sections are closed. In this arrangement, the rubber body is not only compressed between the two sides of the recess that receives the strip seal but it is compressed between one side of the recess and one edge of the strip seal insert itself.

BRIEF DESCRIPTION OF THE DRAWINGS

FIGS. 5 and 6 are sectional views taken on lines 5—5 and 6—6 of FIG. 4;

FIG. 7 is an isometric view, partly exploded, of the various sealing elements of the present invention;

FIG. 8 is an exploded isometric view showing in phantom lines the rubber bodies of some of the seal elements and showing in solid lines the inserts contained in such elements;

DESCRIPTION OF THE PREFERRED EMBODIMENT

Figure 4:
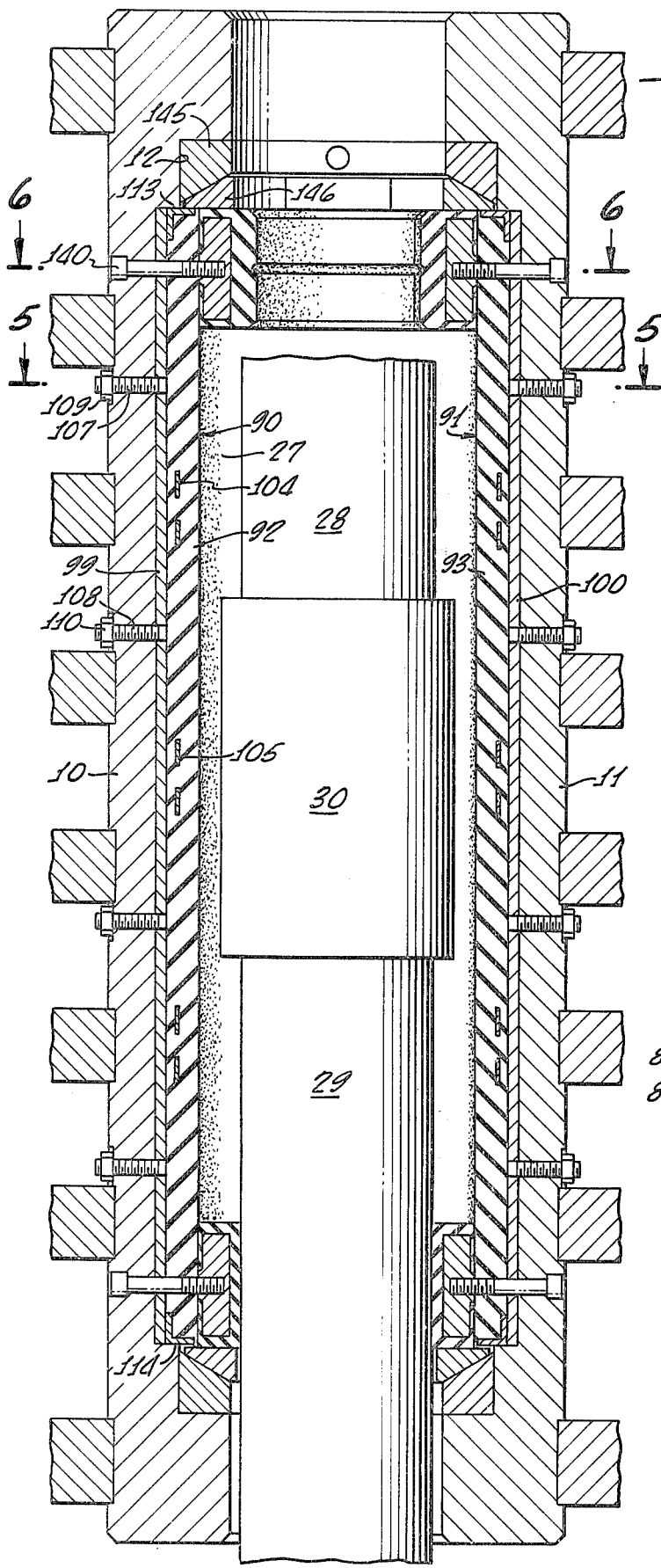
FIG. 4 is a fragmentary vertical sectional view of the apparatus.

The apparatus comprises two semi-cylindrical casing sections 10 and 11, the upper and lower ends of which are necked down, as indicated at 12 in FIG. 4. The casing is greatly and uniformly strengthened and reinforced by a symmetrical cage formed of opposed ribs which are respectively welded to casing sections 10 and 11, the cage also being formed of opposed bars which extend between pins through the ribs. The entire apparatus, other than the various sealing strips to be described below, including their mode of connection to the casing sections, is substantially the same as that described in U.S. Pat. Nos. 3,975,945 and 4,099,405 and may in fact be substantially similar to that described in U.S. Pat. No. 3,371,521, except, for the various modifications of the casing sections required to cooperate with the several sealing elements as will be described more particularly hereinafter. Therefore, a full and more detailed description of the casing sections and their operation is found in the prior patents and the disclosures of these patents are incorporated by this reference as though fully set forth herein.

Briefly, ribs 15 are welded to casing section 10 and ribs 16 are welded to casing section 11. Four pins 17-20 are provided of which pins 17-19 are permanently fixed in position, and fourth pin 20 is a retractable lock pin which is cylinder operated as will be described below.

The opposed pins 17, 18 at the rear of the cage, the rear being a portion diametrically opposite the region which opens to receive a section of pipe to be tested, are connected by hinge bars 24. The pins 19 and 20 at the front of the cage are connected by lock bars 25 which are pivotal as stated below. Hinge bars 24 and lock bars 25 are sufficiently thick to fill in the spaces between adjacent ones of ribs 15 and 16, the result being that all of the pins 17-20 are in total shear and not subjected to bending stresses.

Figure 1:
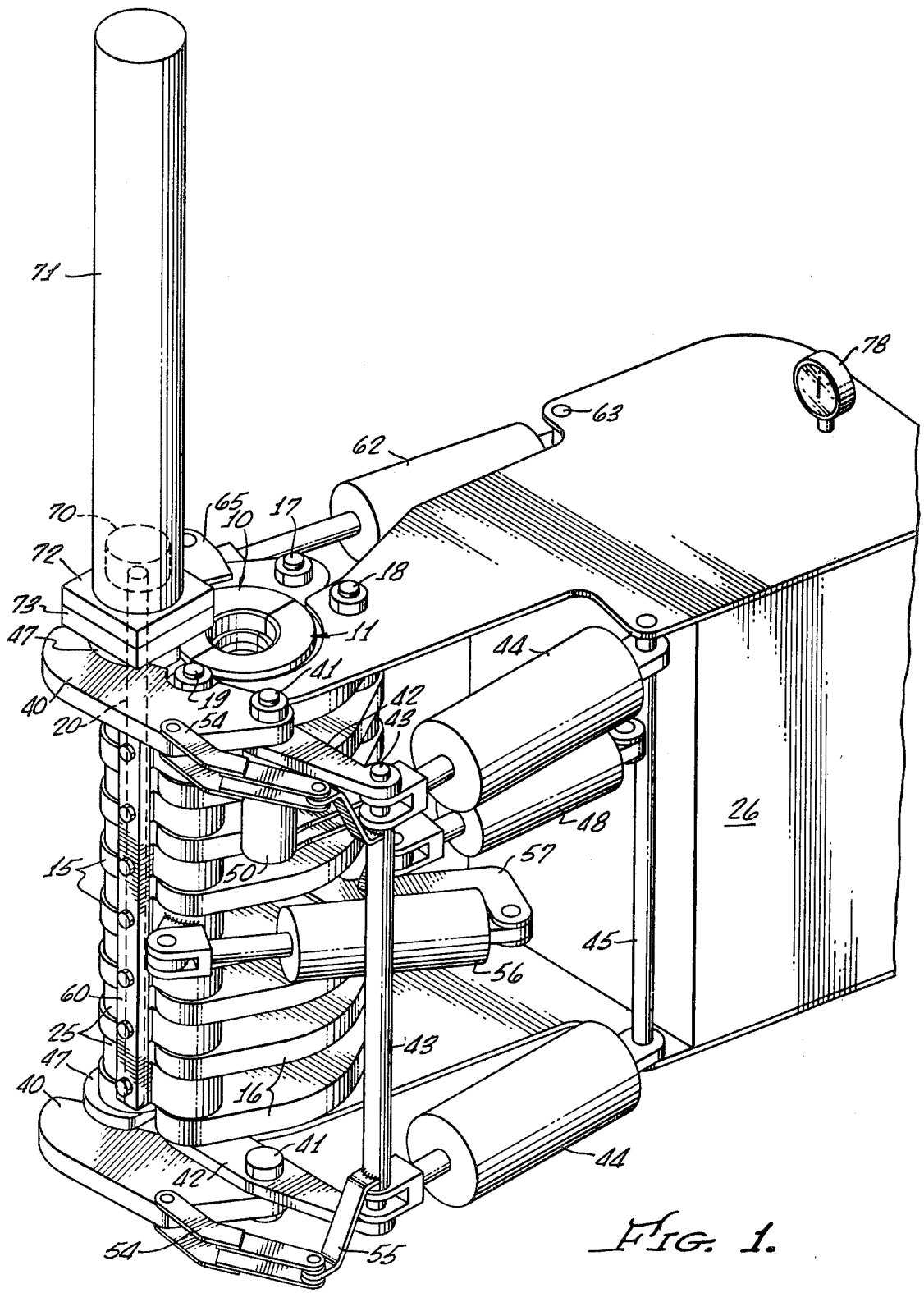
FIG. 1 is an isometric view showing the present leak testing apparatus in closed condition.

The described cage and related apparatus are connected to a suitable valve housing indicated at 26 in FIG. 1 and are suitably suspended by means (not shown) at the well head of an oil well. The upper and lower walls of the valve housing 26 extend forwardly and are bolted respectively above the uppermost ones of ribs 16 and below the lowermost one of such ribs.

In order that the casing formed by elements 10 and 11 and associated parts may define a sealed chamber (the "test chamber") around a section of pipe, seal means are provided within the casing as described below. Referring, for example, to FIG. 4, the apparatus is particularly adapted to define an annular test chamber 27 wherein the pipe section is formed by two pipe elements 28, 29, which are connected by a threaded collar 30. Such pipe may be drill pipe, casing pipe and the like. As described below, the seal means is primarily rubber and includes portions which are compressed in response to closing of the casing. Thus closing of the casing requires a certain amount of force in order to overcome resistance provided by the rubber and to create a certain amount of augmented sealing compression.

Figure 2:
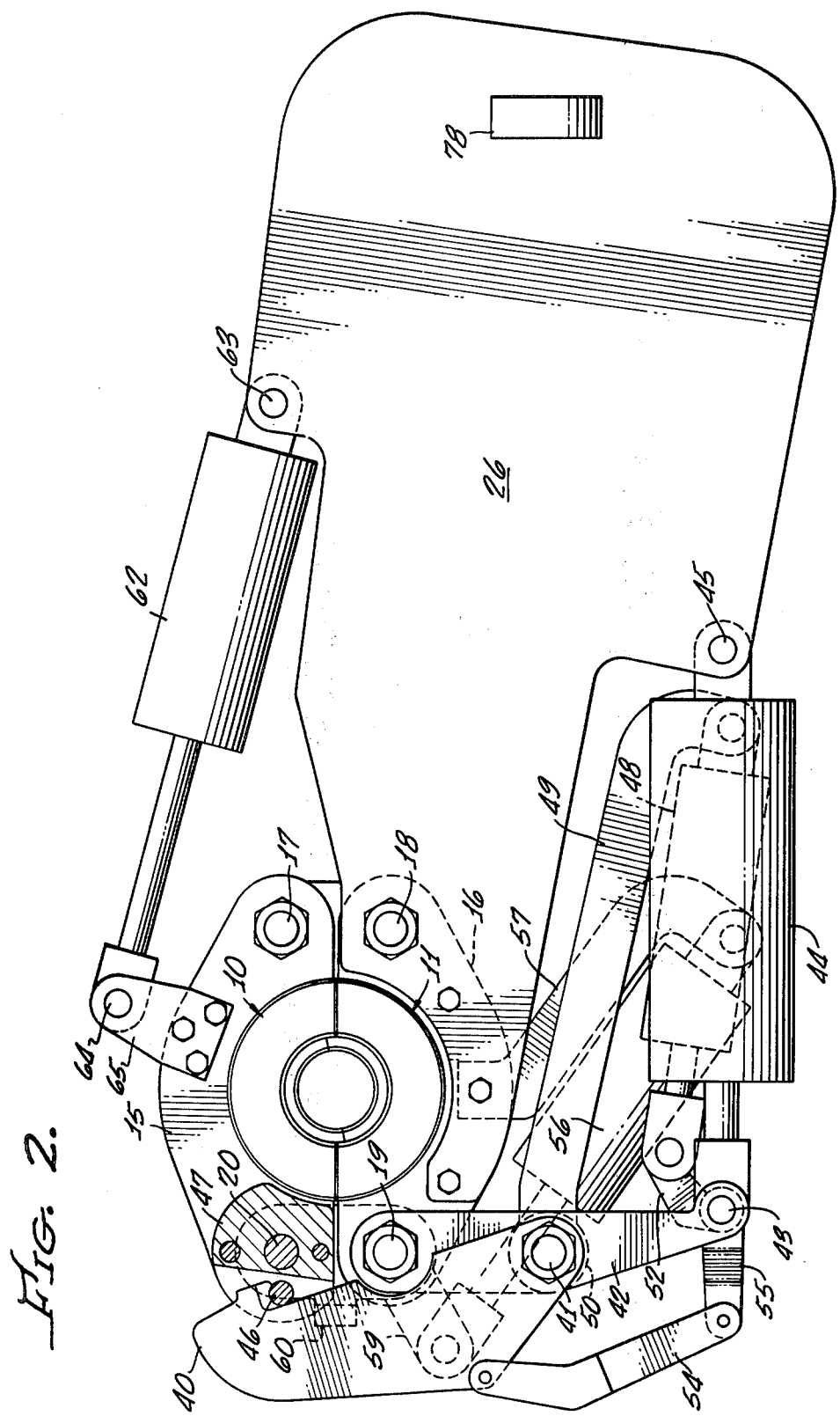
FIG. 2 is a top plan view, partly in section, illustrating the apparatus in fully closed condition, an illustration of a lock pin cylinder being omitted.
Figure 3:
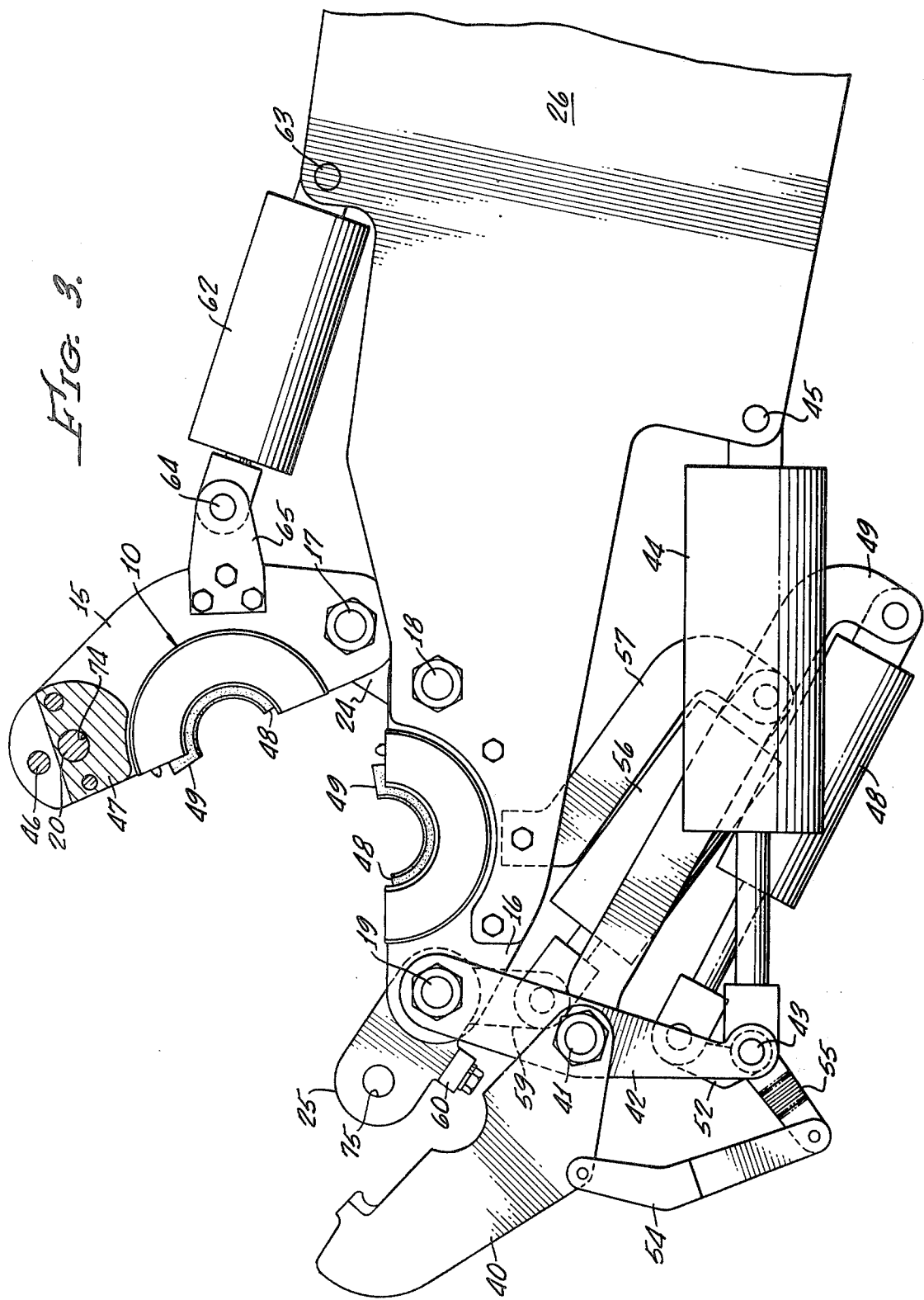
FIG. 3 is a view corresponding to FIG. 2, but showing the parts in open position.

Mechanisms for opening and closing the casing and locking the same are illustrated in FIGS. 2 and 3, which show the casing and closing mechanism in closed and open position, respectively. As previously mentioned, this mechanism is shown and described in greater detail in U.S. Pat. Nos. 3,975,945 and 4,099,405.

The casing is closed by apparatus, including hooks 40, one of which is mounted near the top of the casing and one of which is mounted near the bottom thereof. Each hook is pivotally connected by a short pin 41 to a lever 42, one end of which is pivoted to pin 19 for lock bars 25. The other end of each lever 42 remote from pin 19 is pivoted to a pin 43 and thus to an actuating cylinder 44. Each cylinder 44 is in turn pivotally connected to a pin 45 which is fixed between the upper and lower walls of valve housing 26. The hooks pivot about the pins 41 which are supported by levers 42.

Hooks 40 and the associated levers 42 form compound lever systems which, when cylinders 44 are shortened, cause the hooks to move to fully close the casing and its associated cage, thus creating a preliminary sealing compression in the seal means. The hook members hook around index and closing pins 46 which are provided in grooved blocks 47 on the uppermost and lowermost ribs 15.

The particular details of operation and type of closing system employed are not a significant part of this invention as long as the closing is forcibly accomplished and sufficient to provide adequate preliminary compression on the seals and to maintain the casing segments in close juxtaposition (in closed position) in the presence of the extremely high pressures introduced to the interior thereof during the test period. Thus the lever systems may employ locking hooks of the type shown in U.S. Pat. No. 3,371,521, or in the prior U.S. Pat. Nos. 3,975,945 and 4,099,405. The hooks may move over center or may be arranged so as not to move over center.

When the hooks 40 are in position such that they do not bear against their pins 46, they may be pivoted to a wide open position of FIG. 3 due to the operation of a cylinder 48, pivoted to a bracket 49, which is welded to a tube 50, the latter in turn being welded to the underside of top lever 42.

The other end of cylinder 48 is connected to a crank 52 on a sleeve which is rotatably mounted on pin 43. Welded to the upper and lower ends of the sleeve are additional cranks 55 which pivotally connect through links 54 to central outer regions of the hooks 40.

In order to cause pivotal movement of the lock bars 25 to the wide open position of FIG. 3, thus greatly facilitating lateral introduction of the pipe 28, 30 into the test chamber 27, an additional cylinder 56 is pivotally connected to a bracket 57 which in turn is bolted to one of the ribs 16. The other end of this cylinder 56 is connected to a crank 59 which is mounted on one of the lock bars 25. This one lock bar 25 is in turn connected to all of the other lock bars by means of a vertical connector bar 60. Bar 60 is rigidly held in place so that there is a rigid association between all the lock bars 25 whereby they will close to precise positions.

After the apparatus has been unlocked and unhooked, the casing may be opened to the position shown in FIG. 3 by operation of cylinders 62, only one of which is shown. One end of each cylinder 62 is pivoted at 63 to a pin which extends between the upper and lower walls of housing 26. The other end of each cylinder is pivoted at 64 to a bracket 65 bolted to one of the ribs 15.

In the general operation of the tool thus far described the pipe elements 28, 30 are introduced laterally into the apparatus when the casing and cage are in the wide open position of FIG. 3, following which cylinders 62 are actuated to close the casing and cage. Cylinder 56 is operated to pivot the lock bars 25 to the closed position, cylinder 48 is operated to effect pivotal movement of hooks 40, and cylinders 44 are operated to cause the hooks to shift pins 46, to thereby effect pressure closing of the casing despite the presence of protruding rubber in the seal means.

The lock pin 20 is then shifted downwardly by means of its connection to a piston 70 which is mounted slidably in a vertical cylinder housing 71 having a flange 72 at the lower end thereof. The flange 72 is suitably connected by means (not shown) to a corresponding plate 73 which is mounted to the uppermost rib 15. The position of mounting is such that the pin 20 registers with the uppermost bore in ribs 15.

As in the case of the various cylinders 44, 48, 56, and 62 described above, cylinder housing 71 is associated with suitable hydraulic lines or pneumatic lines (not shown) and with valves (not shown) which are incorporated in housing 26. Each of these cylinders is double acting so that the operation of the associated valve means may shift the various pistons in both directions.

Reinforcing ribs 15 are provided with a number of aligned bores 74 and lock bars 25 are provided with a corresponding and cooperating series of bores 75. Upon a closing of the casing by operation of the various cylinders, the bores 74 and 75 are all mutually aligned by means of stop and shim devices more specifically described in the prior patents, and thus the lock pin 20 may be driven through all of these aligned bores to hold the casing sections in closed position.

During testing operations with the casing closed around a pipe joint, a suitable liquid such as water, for example, is introduced into the test chamber 27 by means of a conduit 76 connected by means of a fitting 77 to an aperture extending through the casing side wall. Existence of a leak in the pipe joint is indicated by a reduction of pressure within the test chamber, as displayed by a gage 78 mounted to housing 26.

There are formed in the respective casing sections 10 and 11, extending for substantially the full length thereof, namely between the necked down regions 12, longitudinal recesses which are preferably diametrically opposite each other. These longitudinal recesses are adapted to receive longitudinal sealing elements or sealing strips.

Figure 10:
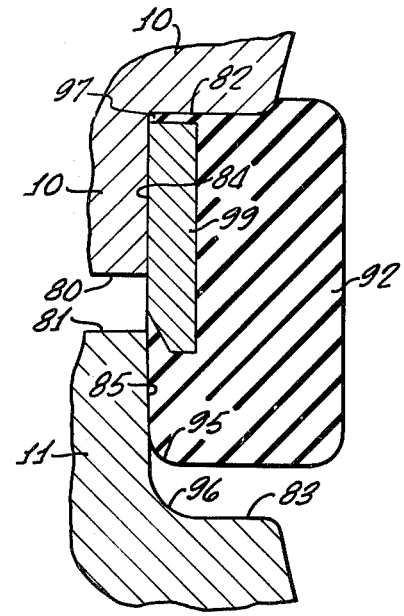
FIG. 10 is a view like that of FIG. 9 showing the casing segments in nearly closed, but partly open, position.
Figure 9:
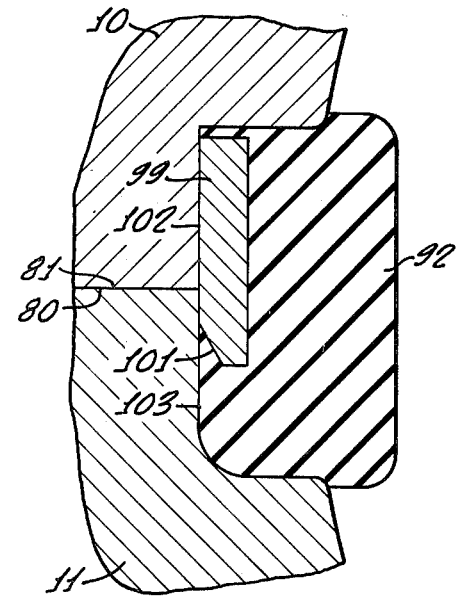
FIG. 9 is a fragmentary section showing the strip seal and casing segments in closed condition.

Each recess is formed of two nearly equal and symmetrical rebated portions formed in facing closure surfaces 80, 81 of casing sections 10 and 11, respectively, when the two sections are in closed position (FIGS. 9 and 10). Each rebated portion of the facing surface of the casing section includes a side wall 82, 83 and a bottom wall portion 84, 85, which bottom wall portions are co-planar when the casing sections are closed. The recess side walls 82, 83 extend substantially radially whereas the co-planar bottom wall portions 84, 85 extend in a tangential direction. The recess formed by the two rebated portions is substantially symmetrical about the longitudinal casing joint.

To seal the longitudinal joint between the facing surfaces 80, 81 of the casing sections and to provide for indexing of the two sections during closure, the longitudinally extending recess at each of the longitudinal casing section joints is provided with a seal strip or longitudinal sealing element 90, 91, respectively. The indexing function of the sealing element assures alignment of the two casing sections as they are closed to properly position these sections relative to one another along a radial plane of the casing.

Each seal strip comprises a unitary elongated molded rubber body 92, 93 having a substantially rectangular cross section (FIG. 10). Some of the corners of the rubber body may be rounded such as the corner 95 which is rounded to fit a similar rounded corner 96 formed at the junction of the recess walls 83, 85 of casing section 11. The opposite corner 97 of the rubber body may be more sharply angulated to conform to the more sharply angulated corner formed by the junction of walls 82, 84 of casing section 10. At each end of the rubber body 92 there is formed a laterally outwardly facing recess or notch 94 to enhance its engagement with the arcuate sealing segments to be described below.

Molded to and within the rubber body 92, 93 of each of the seal strips is non-deformable insert bar 99, 100 which performs a number of functions. Since the two seal strips 90, 91 are identical to each other, only one need be described. As previously mentioned, the insert 99 (a) reinforces the rubber body, (b) enables the rubber body to be securely mounted to its casing section, (c) provides an indexing function, and (d) prevents extrusion of the rubber body. The insert preferably comprises a rigid flat elongated metal strip running substantially the full length of the rubber body and having a rectangular cross section of which an outer free edge is beveled as indicated at 101 (FIG. 9). Insert bar 99 has an outer surface 102 that is co-planar with an outer surface 103 of the rubber body 92. Thus the insert bar itself forms part of the outermost surface of the seal strip. To enhance the attachment of the insert to the rubber body, which is molded about and to the insert, the latter has fixed thereto a number of holding brackets such as those indicated at 104, 105 (FIG. 8). Although the brackets may take many different configurations, it is preferred at present to employ brackets that, as illustrated, are of substantially channel shape, having side legs welded to the inner surface of the bar 99 and having a channel web spaced from the bar and apertured so as to enhance flow of rubber into the area between the bar and the holding bracket during the molding operation.

In order to mount the entire seal strip to the casing, the strip insert is formed with a plurality of longitudinally spaced apertures into which are inserted and securely affixed, as by welding for example, a number of threaded studs such as those indicated at 107, 108. The studs extend outwardly from the seal strip, from the outer surface of the insert bar 99, through correspondingly positioned apertures formed in the casing wall, and are secured thereto by nuts 109, 110.

Fixed to the inner surface of each end portion of the insert bar 99 is a right angle bracket 113, 114 that defines a gap clip having an inwardly projecting flange extending along the end of the rubber body to aid in preventing extrusion thereof. Each seal strip is further provided with an aperture, such as aperture 115, extending completely therethrough closely adjacent each end for further connection to the casing and to the circular seal segment as will be described below.

Each end of the test chamber 27 is sealed by a pair of arcuate sealing segments 120, 121, 122, 123. Just as the two sealing strips are identical to each other, each of the pairs of circular sealing segments at the opposite ends of the test chamber are identical to each other. Not only are the pairs of sealing segments identical to each other, but each segment of each pair is identical. Thus only one substantially semi-circular sealing segment type need be made and stocked and will suffice to replace any one segment, regardless of which end or side of the casing it is for. Since each segment is identical to each other segment, only one need be described. Each segment comprises a circular body extending for slightly more than a full half circle, and having a generally rectangular cross section. The molded rubber body is stiffened by a generally arcuate metal insert 128 having upwardly and downwardly projecting teeth, such as teeth 129, 130, to enhance securement of the insert to the rubber body 126, the latter being significantly reinforced by the insert. One of the end faces of the semiannular rubber body 26 is formed with a projection in the form of a pair of outwardly converging inclined surfaces 131, 132 and the other end face is formed with a corresponding pair of inwardly converging surfaces 133, 134, the two end surfaces thus forming respective projections and grooves that mate with the corresponding grooves and projections of the other segment of a pair (see FIGS. 5, 6, 7, and 8).

Each arcuate insert 128 extends from a point adjacent one end, such as end 133, 134 of body 126, to a point spaced from the other end of such body. At such other end of the rubber body preferably (but not necessarily) the end at which the outwardly converging surfaces 131 and 132 are formed, the radially outward surface of the rubber body is formed with an inwardly extending and outwardly facing recess 136. Just within the bottom wall of such recess, completely molded within the rubber body, is a second metal insert 137 having a somewhat flattened cylindrical configuration and having a thickness that is a major portion, preferably a little more than one-half, of the total thickness of the annular segment. Insert 137 is formed with an outwardly projecting boss 138 that extends to the outermost surface of the rubber body 126. The boss is drilled and tapped to receive a connecting bolt 140 adapted to extend through a hole in the casing section 10 and through a hole 115 near the end of the seal strip.

Prior to closing of the casing sections, each segment extends for substantially more than 180 degrees in order to insure that there will be a significant amount of initial sealing compression between the interengaging end surfaces of the segments when the casing is closed.

The notch 94 at opposite ends of the seal strips permit such upper ends to be a snug fit within the rectangular section of the recess 136 of the segment.

In assembly of the sealing elements to the casing sections, strip seal elements 90, 91 are first positioned adjacent the recessed, rebated portions of the associated casing sections 10 and 11, respectively. The threaded studs 107, 108, etc., are positioned at the apertures of the casing sections, extended therethrough and bolts 109, 110, etc., are secured to thereby fixedly attach the entire sealing strip firmly and securely to its respective casing section. It will be noted that such a method of attachment is considerably easier than a method which does not employ the fastening studs already fixed to the insert. In prior methods where separate bolts are provided, it is first necessary to position the sealing strip so as to insure alignment of all of the sealing strip apertures with similar apertures of the casing section and then insert the bolts through such aligned apertures. In the present arrangement no such apertures need be aligned. It will be noted that the outer surface of reinforcing strip 99 is in close abutment with the bottom wall portion 102 of this part of the longitudinal recess of the casing sections. Thus one sealing strip is secured to one casing section and the other strip is secured to the other casing section. The sealing strips each project laterally of the casing section and face.

The width of the rubber body 92 is greater than the width of the recess between side walls 82 and 83 when the two casing sections are in the closed position of FIG. 9. Thus, during closing of the casing sections, the apparatus will approach a position, such as illustrated in FIG. 10, wherein the opposing casing section surfaces 80, 81 are spaced from each other and yet the wall 83 now nearly contacts the side wall of the rubber body 92 which is relatively more remote from the insert 99. Further motion of the two casing sections from the position of FIG. 10 toward the position of FIG. 9 will compress the rubber body. The arrangement and position of the insert 99 provides a greatly enhanced compression ratio during such compression. In other words, the ratio of the width of rubber in compressed condition (as shown in FIG. 9) to the width of rubber in non-compressed condition (as shown in FIG. 10) is considerably increased by reason of the fact that a lesser amount of uncompressed rubber is provided because of the particular positioning of the insert 99. Actually the rubber is compressed during this final closing motion between the side wall 83 of the rebated portion of casing section 11 and the end of insert 99 that faces this side wall.

After the seal strips 90, 91 are fixed to the casing sections with their upper and lower ends abutting the shoulders between necked down casing portion 12, the several arcuate seal segments may then be attached. Each seal segment is attached by pressing its groove 136 over the notched end 94 of the seal strip, aligning the aperture 115 in the end of the seal strip with the aperture in the insert 137 of the arcuate segment, and pressing the outer surface of the boss 138 of insert 137 directly against the inner surface of the rubber body 92. This provides an improved sealing connection between the seal strip and the arcuate segment to which it is attached. Bolt 140 is then inserted through the aperture in the casing section 10, through the aperture 115 in the end of the seal strip and is threaded into the tapped aperture of insert 137 to firmly and securely attach the arcuate segment and upper end of the seal strip to the casing and to achieve initial compression of the circumferential and longitudinal seals and the casing.

All four arcuate seal segments are similarly attached.

FIGS. 9 and 10 illustrate several of the functions of the insert 99. As the casing sections close from the position of FIG. 10 to the position of FIG. 9, bevel 101 of the non-deformable insert 99 will initially engage the inner edge of surface 81 of casing section 11 to snugly engage or to slightly press the latter radially outwardly. The casing sections 10 and 11 are so mounted that the bottom wall portion 85 of section 11 is at least co-planar with or positioned slightly inwardly of the plane of bottom wall portion 84 of section 10 to enhance the indexing action of the insert bar 99. Thus the beveled surface 101 of bar 99 will insure relative radial alignment of casing sections 10 and 11 as the two move toward their final closed position. Further, in this final closed position, the outer surface of the insert bar 99 is snugly positioned against both of the bottom wall portions 84 and 85 of the recess. It bridges the longitudinal joint of the casing and extends for a substantial distance on either side of the joint. The outer surface of the non-deformable insert 99 is positioned directly against the wall portions 84 and 85 and is further pressed against these wall portions by the test pressure introduced to the interior of the test chamber. The higher the pressure within the test chamber, the more tightly is the insert bar 99 pressed against the bottom wall of the casing section recess and the better it will operate to prevent extrusion of the rubber body of the seal strip.

It will be noted that the rectangular cross section groove 136 of the circular segment extends for the full length (axially of the cylindrical casing) of each segment and that the end portion of the seal strip, including both the rubber body and its insert, also extend for the full length of the segment to which it is attached. This arrangement affords increased area of sealing contact between the seal strip and the attached segments and enhances sealing of the joints therebetween.

Wedge means are provided to prevent longitudinal upward or downward extrusion of rubber in the arcuate seal segments. Such wedge means comprise at each end of the tool a backup ring formed in two halves or segments 145 corresponding to the two casing sections 10 and 11 and fixedly secured to the casing sections, the backup ring seating in the necked down section 12.

Movably mounted beneath the ring segments 145, which have inner inclined surfaces converging in a direction away from the center of the test chamber, are wedge segments 146, which are loosely held in position to the casing by screws (not shown). Wedge segments 146 have inclined surfaces which engage and cooperate with the inner inclined surfaces of the ring segments 145. The relationships are such that longitudinally outward movement of the wedge segments 146 resulting from testing pressures tends to cause inwardly directed movement of the wedge segments 146 into extremely close abutment with the adjacent regions of the pipe, thus increasing the longitudinal extrusion prevention function.

An improved, more efficient and greatly simplified set of sealing elements has been described for a leak testing apparatus, the elements including a unitary assembly in which a number of functions are performed by an insert of improved configuration and location and in which cooperation between arcuate end sealing segments and longitudinal sealing strips is greatly enhanced to provide a more effective mounting and sealing engagement of the sealing elements at the end of the test chamber.

The foregoing detailed description is to be clearly understood as given by way of illustration and example only, the spirit and scope of this invention being limited solely by the appended claims.

We claim:

1. Apparatus for detecting leaks in joints in pipe sections, which comprises:
   casing means adapted to open for lateral reception of a jointed pipe section, and then to close to define a chamber around at least one joint in said pipe section,
   means to lock said casing means in closed condition,
   means to seal said chamber without the necessity of employing a packer therein,
   said seal means including a longitudinal strip seal for sealing a longitudinal joint between opposed regions of said casing means when the latter is in closed condition,
   said strip seal having a rubber body adapted to be deformed in response to closing of said casing means, and to be further deformed in response to creation of high fluid pressures within said chamber,
   said rubber body of said longitudinal strip seal having molded at an outer surface thereof substantially nondeformable insert means adapted to cooperate with said longitudinal strip seal in sealing very high fluid pressures in said chamber, said insert means bridging said longitudinal joint and adapted to be pressed against said casing means to prevent extrusion of said strip seal through said longitudinal joint,
   said seal means further including end seal means provided around said pipe section at the ends of said chamber to prevent escape of high-pressure fluid longitudinally of said pipe section,
   means to create a very high fluid pressure in said sealed chamber, and
   means to indicate a reduction in the fluid pressure in said chamber, thus indicating the presence of a leak in a joint in said pipe section.

2. The invention as claimed in claim 1 including means for fixedly connecting said insert means directly to one of said opposed regions of said casing means to thereby effect mounting of said strip seal to said casing means.

3. The invention as claimed in claim 2, in which said insert means comprises bar means extending longitudinally of said longitudinal strip seal, in which substantially none of said rubber body is interposed between said bar means and the region of said casing means to which said insert means is adapted to be mounted, and in which threaded studs fixed to said bar means are provided to connect said casing means region to said bar means.

4. The invention of claim 3 wherein rubber holding means are fixed to said bar means and embedded within said rubber body to enhance the attachment of said rubber body to said bar means.

5. The invention of claim 3 wherein gap clip means are fixed to ends of said bar means and extend inwardly along ends of said rubber body to prevent longitudinal extrusion thereof.

6. The invention of claim 4 wherein said holding means comprises a plurality of apertured channel shaped brackets welded to said bar means.

7. Apparatus for detecting leaks in joints in pipe sections, which comprises:
   casing means adapted to open for lateral reception of a jointed pipe section, and then to close to define a chamber around at least one joint in said pipe section, said casing means comprising
   first and second casing sections having opposed longitudinal end faces forming a longitudinal joint when the casing means are closed, said sections having mating rebated edges adjacent said joint that collectively define a longitudinal recess having mutually spaced substantially radially extending side walls formed by respective rebated edges of said casing sections and a bottom wall formed by substantially tangential wall portions of respective rebated edges of said casing sections, said tangential wall portions being co-planar when said casing means are closed, means to lock said casing means in closed condition, means to seal said chamber without the necessity of employing a packer therein, said seal means including means to seal the ends of said chamber, said seal means further including a longitudinal strip seal for sealing said longitudinal joint when the casing means is in closed condition, said strip seal comprising, a rubber body having non-deformable insert means molded therein substantially at an outer surface thereof, said insert means being fixed to and in close juxtaposition with the tangential wall portion of one of said casing sections, said insert means being adapted to bridge said joint and extend into close juxtaposition with the tangential wall portion of the other of said casing sections when said casing means are closed, whereby said insert means reinforces said strip seal rubber body, mounts said strip seal rubber body to said one casing section, assists in indexing said sections upon closing, and prevents extrusion of said rubber body, means to create a very high fluid pressure in said sealed chamber, and means to indicate a reduction in the fluid pressure in said chamber, thus indicating the presence of a leak in a joint in said pipe section.

8. The apparatus of claim 7 wherein said insert means has a width less than the width of said longitudinal recess, wherein said rubber body has a width greater than the width of said longitudinal recess, and wherein said rubber body includes a portion extending against the tangential wall portion of said other casing section between one edge of said insert means and the recess side wall of said other casing section, whereby said rubber body extends for the full width of said recess when said casing means are closed but has an outer portion compressed against an edge of said insert means.

9. The invention of claim 8 wherein said insert means includes an outer surface substantially co-planar with an outer surface of said rubber body and bearing against the tangential wall portion of said one casing section, a plurality of threaded studs fixed to said insert means and projecting from said outer surface thereof, said studs extending through said one casing section for securement thereto.

10. The invention of claim 9 including a plurality of rubber holding means fixed to said insert means and projecting from the inner surface thereof, said holding means being embedded in said rubber body to enhance attachment of said insert means at said outer surface of said rubber body.

11. Apparatus for effecting external testing for leakage in pipe joints, which apparatus comprises:

a casing which is longitudinally divided into at least two sections whereby the casing may open for lateral reception of a jointed pipe section and may thereafter close on said pipe section to thus define a test chamber therearound, means to lock said casing in closed condition on said pipe section, means to seal against leakage at least one longitudinal joint between said casing sections, said longitudinal seal means being formed primarily of rubber and being mounted in a longitudinal groove in said casing, said groove being adjacent a region of proximity between said two casing sections when said casing is in closed condition, means to seal the two ends of said test chamber, said end seal means comprising circumferential seal means formed primarily of rubber and mounted in said casing, each of said circumferential seal means having at least two end faces adapted to abut in compressive sealing relationship, each of said circumferential seal means also having a radially inwardly extending recess portion in an outer surface thereof adapted to align with said longitudinal groove in said casing and to form an extension thereof, said longitudinal seal means having an end extending along said recess between said casing and said circumferential seal means, fastener means extending through said casing, through said end of said longitudinal seal means and into said circumferential seal means to attach both said circumferential and longitudinal seal means to said casing, means to create a very high fluid pressure in the sealed test chamber, and means to indicate a reduction in said fluid pressure to thus indicate the presence of a leak in at least one of the joints of said jointed pipe section.

12. The invention as claimed in claim 11, in which said recess portions are respectively circumferentially offset from said abutted end faces of said circumferential seal means, and wherein said abutted end faces are formed with mutually mating facial protuberance and groove means for enhancement of the interengagement thereof.

13. The invention as claimed in claim 11, in which insert means are molded in said circumferential seal means, said insert means being present at said radially inwardly extending recess portions, and in which fastener means are adapted to effect connections between said casing and said insert means to shift said insert means radially-outwardly and thus achieve initial compression between said circumferential and longitudinal seals and said casing.

14. The invention of claim 11, wherein said longitudinal seal includes a rubber body and a longitudinal seal insert, said longitudinal seal insert being molded to said rubber body at an outer surface thereof, both said rubber body and longitudinal seal insert extending along said recess.

15. The invention of claim 4, wherein circumferential seal insert means are molded in said circumferential seal means at said recess portions, and including fastener means extending through said casing, through an end of said rubber body and insert of said longitudinal seal means into said circumferential seal insert to secure said circumferential seal to said longitudinal seal insert and to said casing and to compress the end of said rubber body of said longitudinal seal between said insert thereof and said circumferential seal.

16. The invention of claim 16 including gap clip means fixed to the ends of said longitudinal seal insert and extending radially inwardly along end faces of said rubber body to prevent longitudinally outward extrusion of said rubber body.

17. An external tester for testing pipe joints by creating very high fluid pressures in the regions exteriorly around the joints, which comprises:
  a casing adapted to open for lateral reception of a jointed pipe section, and to close and lock to thus define a test chamber around said pipe section,
  means to seal said test chamber without the necessity of lining the walls thereof with rubber,
  said sealing means comprising annular end seal elements at the ends of said test chamber to prevent escape of fluid from said test chamber in directions longitudinal to the pipe,
  said sealing means further comprising strip seal elements extending longitudinally of said test chamber for sealing of the longitudinal joints between adjacent sections of said casing,
  said strip seal elements overlapping substantially all of the longitudinal extent of said end seal elements and extending between said casing and said end seal elements,
  means to prevent leakage of fluid through the regions of proximity between said annular and strip seal elements, and
  means to pressurize said chamber and to indicate when the pressure in said test chamber is reducing, thus indicating a leak in a joint in said casing section.

18. The invention of claim 17 wherein at least one of said strip seal elements comprises a rubber body having a substantially non-deformable full length insert bar molded therein, said bar having an outer surface substantially co-planar with an outer surface of said rubber body, said bar extending along and in close bridging contact with portions of said casing on both sides of one of said longitudinal joints to prevent extrusion of said sealing means through said one joint.

19. The invention of claim 18 including fastening means extending through said casing, bar and rubber body into said end seal elements to compress said rubber body, secure said end seal elements to said casing and strip seal elements and to press said bar against said joint.

20. A set of seals for an external testing apparatus adapted to determine the presence or absence of a leak in a pipe joint, comprising:
  at least two longitudinal seals each adapted to seal a longitudinal joint between two sections of the casing of said testing apparatus,
  said longitudinal seals each having a rubber body, and
  at least four arcuate seal segments each two of which are adapted to be employed in sealing the ends of the test chamber in said testing apparatus,
  said arcuate seal segments each having a rubber body,
  at least some of said arcuate seal segments having longitudinally extending recessed portions adapted to sealingly receive the end portions of said longitudinal seals when all of said sealing elements are in a mounted condition in said casing.

21. The invention as claimed in claim 20, in which each of said longitudinal seals has a rubber body and insert means therein, said body and insert means extending along said recessed portions for the full longitudinal extent thereof, said insert means being adapted to be connected to the casing of said testing apparatus, and in which each of said arcuate seal segments has insert means therein adapted to be connected to said casing.

22. The invention as claimed in claim 20, in which the ends of each two of said arcuate seal segments have mating protuberances and grooves adapted to engage each other in sealing relationship whereby said two arcuate seal segments extend for 360 degrees around the pipe, and in which the regions of engagement of said ends are circumferentially offset from said recessed portions.

23. A circumferential end seal means for an external leak testing apparatus for pipe joints, which comprises:
  an arcuate segment formed of molded rubber and having an outwardly opening radially-inwardly extending recess portion relatively adjacent one end thereof,
  a first insert molded in said body at said recess portion and adapted to be urged radially-outwardly to secure said body to said apparatus, and an arcuate insert provided in much of the remaining portion of said molded rubber body.

24. The invention of claim 23 wherein said first insert has a thickness equal to a major portion of the thickness of said segment to thereby enhance securement of said segment.

25. The invention of claim 23 wherein said segment has opposite end faces adapted to seal against corresponding opposite end faces of a similar arcuate segment to form a continuous circular seal, one of said end faces having a groove formed therein and the other of said faces having a protuberance thereon whereby the groove and protuberance of said segment will mate with a protuberance and groove of a similar arcuate segment upon assembly into said leak test apparatus.

26. A longitudinal seal for an external leak tester for a pipe joint, which comprises:
  an elongated molded rubber body, and
  at least one insert formed of a non-deformable material and mounted in said body longitudinally thereof,
  said insert having an outer surface thereof co-planar with an outer surface of said rubber body,
  said insert having threaded studs secured thereto at spaced points therealong and projecting outwardly from said outer surface, and
  means fixed to the other surface of said insert for enhancing attachment of said rubber body to said insert.

27. The invention of claim 26 wherein said attachment enhancing means comprises a plurality of holding elements fixed to said insert and having portions extending along but spaced from said insert, said rubber body being molded around said holding elements and between said elements and said insert.

28. The invention of claim 26 wherein gap clips are fixed to ends of said insert and extend along ends of said rubber body to prevent longitudinal extrusion thereof when said seal is subjected to high pressure.

* * * * *